(12) United States Patent
Panikkar et al.

(10) Patent No.: US 11,200,094 B2
(45) Date of Patent: Dec. 14, 2021

(54) ARTIFICIAL INTELLIGENCE-BASED APPLICATION GUARD

(71) Applicant: Dell Products L.P., Round Rock, TX (US)

(72) Inventors: Shibi Panikkar, Bangalore (IN); Sathish Kumar Bikumala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 103 days.

(21) Appl. No.: 16/747,083

(22) Filed: Jan. 20, 2020

(65) Prior Publication Data

US 2021/0224127 A1 Jul. 22, 2021

(51) Int. Cl.
*G06F 9/46* (2006.01)
*G06F 9/50* (2006.01)
*G06F 9/48* (2006.01)
*G06N 5/04* (2006.01)

(52) U.S. Cl.
CPC .......... *G06F 9/5038* (2013.01); *G06F 9/4881* (2013.01); *G06F 9/5016* (2013.01); *G06N 5/04* (2013.01)

(58) Field of Classification Search
CPC .... G06F 9/5038; G06F 9/4881; G06F 9/5016; G06N 5/04
See application file for complete search history.

(56) References Cited

U.S. PATENT DOCUMENTS 8,473,431 B1\* 6/2013 Mann ...................... G06N 20/00
706/12
2015/0254108 A1\* 9/2015 Kurtzman ................. G06F 9/54
718/104

OTHER PUBLICATIONS

Wikipedia, "Disk Cleanup," https://en.wikipedia.org/w/index.php?title=Disk_Cleanup&oldid=931385657, Dec. 18, 2019, 2 pages.
Wikipedia, "Linear Regression," https://en.wikipedia.org/w/index.php?title=Linear_regression&oldid=935782381, Jan. 14, 2020, 17 pages.
Wikipedia, "Memory Management," https://en.wikipedia.org/w/index.php?title=Memory_management&oldid=934247639, Jan. 5, 2020, 7 pages.

\* cited by examiner

*Primary Examiner* — Gregory A Kessler
(74) *Attorney, Agent, or Firm* — Ryan, Mason & Lewis, LLP

(57) ABSTRACT

Techniques for safe guarding of functionalities of a computer program in an information processing system are disclosed. For example, a method comprises the following steps. A plurality of criticality levels is obtained for a plurality of functionalities of a computer program configured to execute on a computer system, wherein the computer system comprises one or more resources usable to execute the computer program. Data is collected for the plurality of functionalities of the computer program. Usage of the one or more resources for executing the plurality of functionalities of the computer program for a given set of data is predicted. Execution of a portion of the plurality of functionalities of the computer program is ensured based on the predicted usage of the one or more resources and the criticality level for each of the plurality of functionalities.

20 Claims, 7 Drawing Sheets

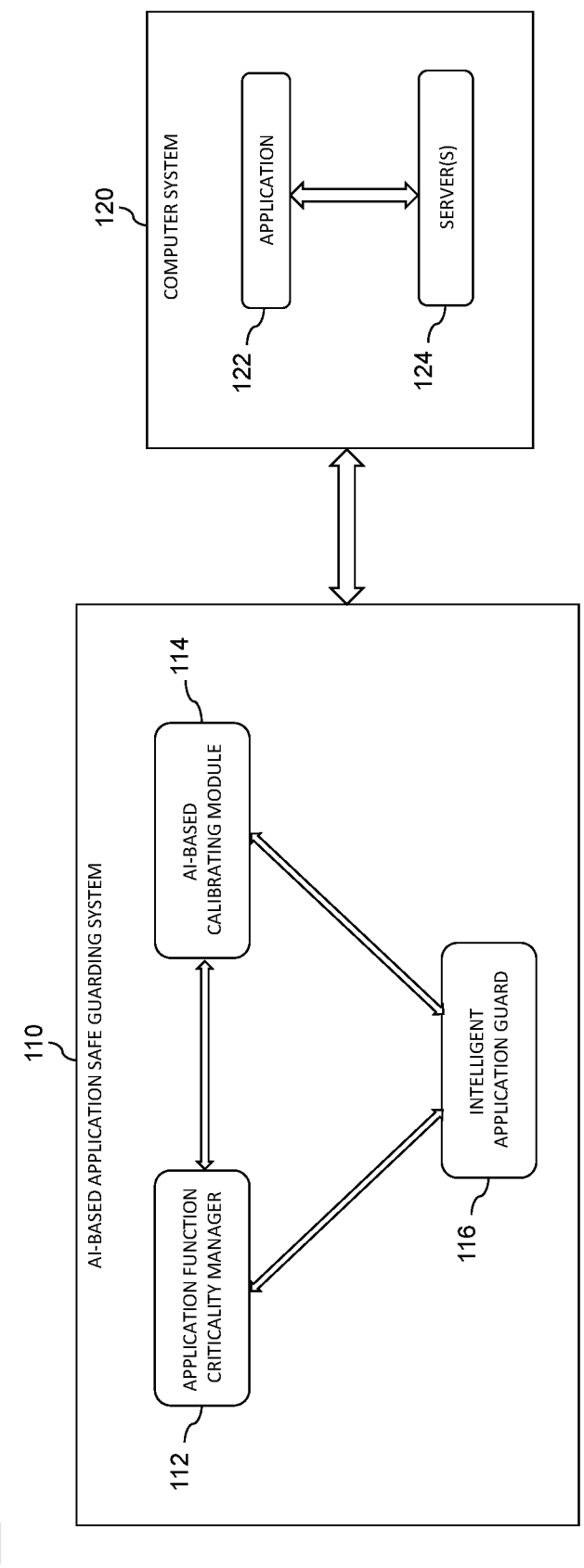

| 202 | 204 | 206 | 208 | 210 | 212 | 214 |
|---|---|---|---|---|---|---|
| Application ID | Business Function | Process Name | Criticality | Priority | Process Type | Service Name |
| OFS | OrderDownload | Ofs_order_download | Critical | 1 | Windows Service | ofsGetOrders |
| OFS | Push Order to FOOE | Ofs_order_release | Critical | 2 | DLL | OrderManagement.dll |
| OFS | Order Routing | Ofs_order_routing | High | 1 | Windows Service | GetFacility |
| OFS | Re-Assignment | Ofs_reassignment | High | 3 | DLL | Reassign.dll |
| OFS | Order HOLD Notification | Ofs_hold_notification | High | 2 | Windows Service | SendHoldNotification |
| OFS | HOLD Release | Ofs_hold_release | High | 3 | WebService | ReleaseHold |
| OFS | License HOLD | Ofs_license_Hold | High | 3 | WebService | BESHold |
| OFS | View Current HOLDS | Ofs_view_hold | Medium | 1 | WebService | ViewHolds |
| OFS | Export All HOLDs for 1 months | Ofs_export_holds | Low | 1 | DLL | ExportHolds |

FIG. 2

| 302 | 304 | 306 | 308 |
|---|---|---|---|
| Service Name | Process | Thread | Identifier |
| ofsGetOrders | ManageOrder.exe | GetOrder | GetOrderMain |
| OrderManagement.dll | w3wp | PushOrder | Xx/yyy/PushOrder |
| GetFacility | ManageRouting.exe | GetFacility | GetFacilityMain |
| Reassign.dll | w3wp | ReAssign | Xx/yyy/ReAssign |
| SendHoldNotification | HooldManagement.exe | SendNotification | SendNotificationMain |
| ReleaseHold | w3wp | ReleaseHold | Xx/yyy/ReleaseHold |
| BESHold | w3wp | BESHOLD | Xx/yyy/BESHOLD |
| ViewHolds | w3wp | ViewHold | Xx/yyy/ViewHold |
| ExportHolds | ExportManager.exe | HoldReports | HoldReportsMain |

FIG. 3

| 402 | 404 | 406 | 408 | 410 | 412 | 414 |
|---|---|---|---|---|---|---|
| Process | Thread | Identifier | Time Elapsed | Memory | CPU | Disk |
| ManageOrder.exe | GetOrder | GetOrderMain | 138977 | 234Mb | 7% | 0.3Mb/s |
| w3wp | PushOrder | Xx/yyy/PushOrder | 34565 | 17.5Mb | 3% | 0.2Mb/s |
| ManageRouting.exe | GetFacility | GetFacilityMain | 34534 | 180Mb | 4% | 0.03Mb/s |
| w3wp | ReAssign | Xx/yyy/ReAssign | 187465 | 187Mb | 3% | 2.1Mb/s |
| HooldManagement.exe | SendNotification | SendNotificationMain | 87657 | 124Mb | 4% | 1.2Mb/s |
| w3wp | ReleaseHold | Xx/yyy/ ReleaseHold | 124435 | 132Mb | 0.02% | 0.19Mb/s |
| w3wp | BESHOLD | Xx/yyy/ BESHOLD | 45336 | 98Mb | 0.07% | 0.98Mb/s |
| w3wp | ViewHold | Xx/yyy/ViewHold | 23434 | 78Mb | 0.02% | 0.07Mb/s |
| ExportManager.exe | HoldReports | HoldReportsMain | 456786 | 450Mb | 4.2% | 3.2Mb/s |

FIG. 4

ARTIFICIAL INTELLIGENCE-BASED APPLICATION GUARD

FIELD

The field relates generally to information processing systems, and more particularly to techniques for artificial intelligence (AI)-based safe guarding of functionalities of a computer program (e.g., application) in such information processing systems.

BACKGROUND

Currently in the industry, there are many monitoring tools that monitor memory and central processing unit (CPU) usage of an information processing system (e.g., one or more servers), and service/application programming interface (API) calls throughout the system. Also there are tools which remove temporary and unwanted files to deallocate memory and reduce CPU usage for overall improved system performance.

However, the existing monitoring approaches are not very effective when considering an application running in the system. A specific application can have many different priority processes running as part of the application, e.g., low priority process(es), medium priority process(es), and high priority or critical process(es). If there is a low priority process consuming memory and CPU time, such process can impact a high priority process, which can lead to performance concerns. The general approach of simply deleting temporary files will not help much because of its reactive nature. Further, existing monitoring and memory file de-allocation services act on the entire system including critical processes and low priority processes.

SUMMARY

Embodiments of the invention provide techniques for artificial intelligence (AI)-based safe guarding of functionalities of a computer program (e.g., application) in an information processing system.

For example, in one illustrative embodiment, a method comprises the following steps. A plurality of criticality levels is obtained for a plurality of functionalities of a computer program configured to execute on a computer system, wherein the computer system comprises one or more resources usable to execute the computer program. Data is collected for the plurality of functionalities of the computer program. Usage of the one or more resources for executing the plurality of functionalities of the computer program for a given set of data is predicted. Execution of a portion of the plurality of functionalities of the computer program is ensured based on the predicted usage of the one or more resources and the criticality level for each of the plurality of functionalities of the computer program.

Advantageously, safe guarding execution of at least a portion of the functionalities is achieved by one or more of de-allocating memory, deleting one or more temporary data files, terminating one or more functionalities with a low criticality level, rescheduling one or more functionalities with a low criticality level, and ensuring one or more functionalities with a critical or a high criticality level are resource-ready for a peak time (i.e., have the resources available to use when the critical/high functionality has to be executed).

These and other features and advantages of the invention will become more readily apparent from the accompanying drawings and the following detailed description.

BRIEF DESCRIPTION OF THE DRAWINGS

FIG. 1 depicts an information processing system environment with an artificial intelligence-based application safe guarding system, according to an illustrative embodiment.

FIG. 2 depicts a data structure maintained by an artificial intelligence-based application safe guarding system, according to an illustrative embodiment.

FIG. 3 depicts another data structure maintained by an artificial intelligence-based application safe guarding system, according to an illustrative embodiment.

FIG. 4 depicts yet another data structure maintained by an artificial intelligence-based application safe guarding system, according to an illustrative embodiment.

DESCRIPTION

Figure 5A:
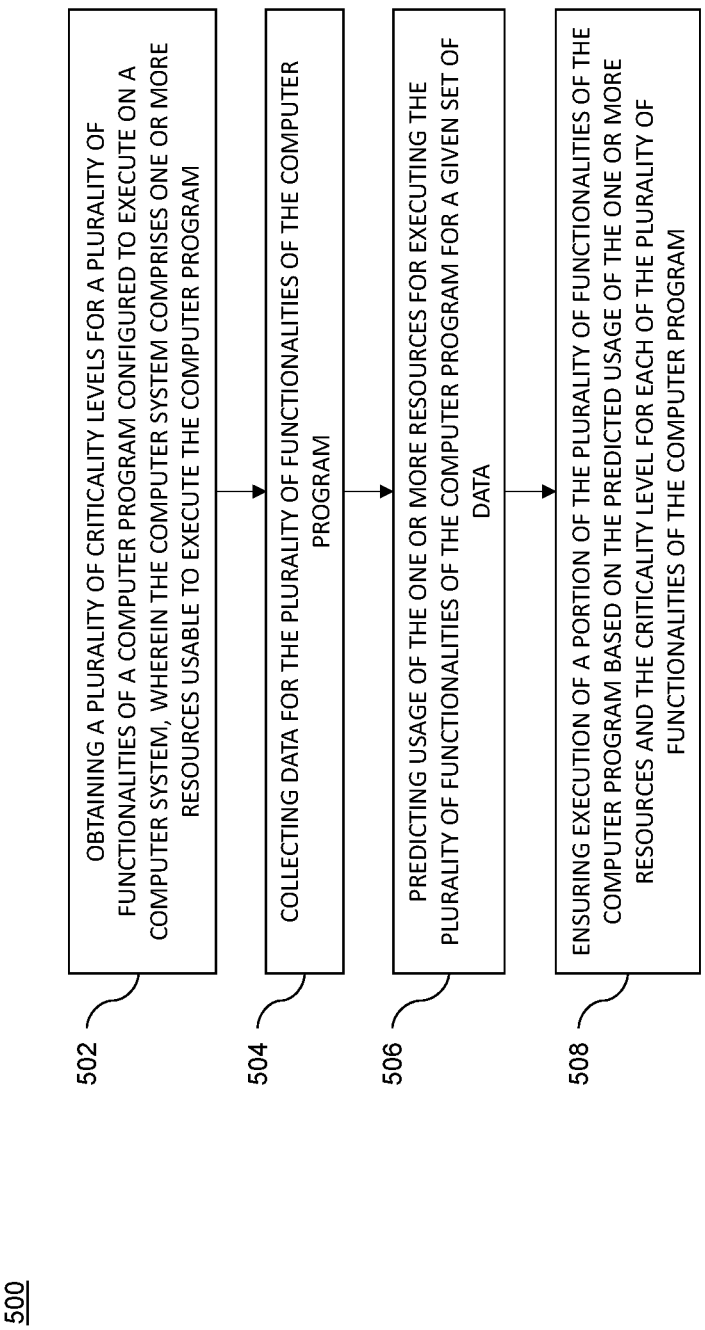
FIGS. 5A and 5B depict methodologies for AI-based application safe guarding, according to illustrative embodiments.

Illustrative embodiments may be described herein with reference to exemplary information processing systems such as, but not limited to, computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "information processing system," "cloud environment," "cloud computing platform," "cloud infrastructure," "data repository," "data center," "data processing system," "computing system," "data storage system," "computing environment," and the like as may be used herein are intended to be broadly construed, so as to encompass, for example, any arrangement of one or more processing devices.

It is realized herein that existing monitoring services, for example, as mentioned in the background section above, do not understand or account for specific application behavior. For example, assume that an application has two processes: (i) a financial relief process (critical); and (ii) a process that exports two years of data in an Excel spreadsheet (low criticality). Both process can run at the same time, and the export process can take up most of the CPU and memory and can cause the critical process (financial relief process) to fail. However, no existing tool can understand the application's nature and act on it. It is realized herein that a tool that could understand the above system could terminate the low criticality process (export process), notify the user, and allow the critical process (financial relief process) to complete.

Embodiments of the invention provide such a tool that overcomes the above and other drawbacks by providing an AI-based system that safe guards functionalities of an application. More particularly, illustrative embodiments provide a smart application safe guarding methodology and system that is configured to understand the behavior/nature of a specific application's functionalities (e.g., business functions, processes, threads, services, etc.), and safe guard its critical and/or high priority functionalities. The same application guarding methodology and system behaves differently for different applications that are registered and configured.

FIG. 1 depicts an information processing system environment 100 with an AI-based application safe guarding system 110 operatively coupled to a computer system 120. As shown, AI-based application safe guarding system 110 comprises the following main components: an application function criticality manager 112, an AI-based calibrating module 114, and an intelligent application guard 116. AI-based application safe guarding system 110 intelligently protects application functionalities associated with an application 122 executing on one or more servers 124 of the computer system 120. While one application and a server-based execution environment are illustratively depicted in FIG. 1, it is to be appreciated that embodiments contemplate that more than one application can be protected at the same time and each application can execute on the same computer system or multiple computer systems, wherein each computer system has the same type or different types of processing devices (e.g., servers, clients, non-server/client architectures, etc.). More particularly, the application safe guarding techniques described herein in accordance with illustrative embodiments are applicable to any computer system executing a computer program that has one or more executable functionalities (e.g., business functions, processes, threads, services, etc.) that would benefit from one or more of the operational performance advantages provided by such safe guarding techniques.

Application function criticality manager 112 is configured to enable a user (e.g., an individual, a processing device, an automated system, or some combination thereof) to register an application (i.e., a computer program), the functionalities of that application, and the criticality of the functionalities. The term "functionalities" as illustratively used herein with respect to an application refers to, by way of example only, one or more of a business function, a process, a method, a thread, a service, a set of code, or parts thereof, associated with an application registered with application function criticality manager 112. Further, as mentioned, the manager 112 is configured to enable the user to define the level of criticality of each functionality of the registered application. For example, in one or more illustrative embodiments, such criticality levels include: "low," "medium," "high," and "critical." The specification of which functionalities of an application are defined as low, medium, high or critical is dependent on the type of application as well as the relative importance among the functionalities performed by the application when executed, e.g., recall the example above of an application having a financial relief process (critical) and a data export process (low criticality). Still further, in one or more illustrative embodiments, the application function criticality manager 112 is configured to enable specification of a priority ordering among functionalities that are assigned the same criticality level. By way of example only, assume two different business functions in a given application are defined with respect to criticality as being critical. A user can set a priority for each of the two critical business functions to specify an ordering of operation (i.e., which one is executed first).

FIG. 2 illustrates a data structure 200 maintained by the application function criticality manager 112 that defines the criticality and priority assigned to each functionality of a given application. As shown, column 202 corresponds to an identifier (ID) of the given application, column 204 corresponds to the business functions of the application, column 206 corresponds to the process names of the business functions, column 208 corresponds to the assigned criticality of the business functions, column 210 corresponds to the priority assigned to the business functions, column 212 corresponds to the process type of the business functions, and column 214 corresponds to the service name of the business functions. More particularly, for each business function (column 204) for a given application having a given application identifier ID (column 202), the assigned criticality (column 206) and priority (208) are specified. Note that, in this tabular example in FIG. 2, some business functions (processes, services) that have the same level of criticality may have the same priority within that level, e.g., some of the business functions with high criticality have the same priority of level 3, meaning that they can be executed in any order or even together by the underlying computer system 120.

Furthermore, application function criticality manager 112 is also configured to enable the user to specify any prior knowledge of failure for any critical service. Prior knowledge can come from the logs, where the functionality might have previously failed due to lack of memory or other resources. A user can provide this information to the application function criticality manager 112 from logs or other system records. Additionally, or alternatively, such logs or other system records can be automatically provided to the application function criticality manager 112. By way of example only, a historical log can specify the free/used CPU, memory and disk space at the time that a critical functionality failed.

Turning now to the AI-based calibrating module 114, the module collects and calibrates data used by the intelligent application guard 116 to protect (ensure, preserve, etc.) functionalities of a given application. More particularly, AI-based calibrating module 114 is configured to derive threads and processes for services associated with a defined business processes of the given application.

As illustratively used herein, a business function is defined as any set of one or more activities performed that is initiated by an event, transform information, materials or business commitments, and produces an output (e.g., order fulfillment, invoicing, cash management, manufactured batch, customer response tracking, etc.). A business process can therefore comprise a set of business functions to complete a complex action. Further, a business process is a collection of linked tasks which find their end in the delivery of a service or product to a client. A business process has also been defined as a set of activities and tasks that, once completed, will accomplish an organizational goal. A service, as illustratively used herein, can comprise one or more business functions or business processes. Alternatively, a business function or business process can comprise one or more services. A thread as illustratively used herein refers to the highest level of code executed by a processor (e.g., CPU). The processor is typically designed to handle many threads at the same time. Thus, for example, when a processor is used to implement all or parts of one or more business functions, processes or services on a computer, each process performed has at least a single thread. In other embodiments, a service can be a computer-generated program to help a process to execute (e.g., a web client service), a process can be an instance of computer-generated program to execute a function, and a thread can be one or more low-level computer-generated programs to execute a process. All these definitions are operating system dependent and can be determined by consulting the task manager of the computer system. Note that the term functionalities, as illustratively used herein, can refer to one or more of business functions, processes, methods, threads, services, sets of code, parts thereof, or the like.

AI-based calibrating module 114 collects (e.g., generates a snapshot of) a plurality of performance attributes over a given time period including, but not limited to, a memory usage, a CPU usage, a disk usage, a process time, a peak time (e.g., a time period or instance when the most resources are used), a low time (e.g., a time period or instance when the least resources are used), a number of threads for each process and business function defined, and predicts the tipping points for each process or thread. Note that, as illustratively used herein, a tipping point is when the rate of the process increases dramatically to a point where some action occurs (e.g., functionality failure). That is, for example, the AI-based calibrating module 114 predicts, for each process, memory, CPU and disk space required and maximum time elapsed for the process to operate in a defined manner over a defined time period. For example, the AI-based calibrating module 114 predicts the resource requirements for the application process to sufficiently operate based on one month of data. A prediction model is created for the application. If the user knows the resource requirements for any given process, then the prediction for that process can be overridden. In one or more illustrative embodiments of the AI-based calibrating module 114, a linear regression algorithm is executed and checks whether or not the prediction model yields correct values, i.e., this algorithm can be run on a daily basis to check the model accuracy. If one or more inaccuracies occur, AI-based calibrating module 114 can then recalibrate the prediction model. Conventional linear regression techniques can be used to provide AI-based processing in AI-based calibrating module 114, wherein such conventional linear regression techniques are known by those of ordinary skill in the art. Once AI-based calibrating module 114 obtains sufficiently accurate data, AI-based calibrating module 114 instructs intelligent application guard 116 to execute.

FIGS. 3 and 4 illustrate respective data structures 300 and 400 maintained by the AI-based calibrating module 114. Note that the names of business functions, processes, threads, and services in FIGS. 3 and 4 are consistent with those referenced in FIG. 2. As shown in tabular data structure 300 in FIG. 3, column 302 corresponds to the service names, column 304 corresponds to the processes, column 306 corresponds to the threads, and column 308 corresponds to service name identifiers. Accordingly, when the application 122 is running, the AI-based calibrating module 114 obtains the process, underlying thread, and unique ID of the thread and process. The operating system of the computer system 120 executing the application 122 and/or the application 122 itself may obtain other details in data structure 300 and may also collect other processes/threads which are consuming additional memory and CPU resources.

More particularly, a CPU performs multitasking thru threads. The CPU assigns each thread an ID and the task/process to perform. Each process also has an ID attached to identify it with respect to other processes. The AI-based calibrating module 114 uses this information in order to prioritize the threads and processes. While general thread/process prioritization is a conventional operation, existing calibration/prioritization does not have business context in order to assess what process is more critical. Illustrative embodiments are aware of business context and thus can better calibrate and prioritize based on the importance of a business function/process.

Then, when the application 122 runs in production (i.e., online, real-time) on server(s) 124, AI-based calibrating module 114 continuously collects the data shown in tabular data structure 400 in FIG. 4 over a period of time (e.g., one/two months). As shown, column 402 corresponds to the processes, column 404 corresponds to the threads, column 406 corresponds to the service name identifiers, column 408 corresponds to elapsed time for each process, column 410 corresponds to memory resource usage for each process, column 412 corresponds to CPU usage for each process, and column 414 corresponds to disk usage for each process. In one example, the AI-based calibrating module 114 calculates, for the given application, 74% total memory usage, 42% total CPU usage, and 20% total disk usage (% refers to the percentage of the total resources required to execute the given application).

Apart from the defined process, the AI-based calibrating module 114 takes all other high memory and CPU consuming processes and threads. The continuous snapshot is taken for all the above details over a period of time, e.g., two months of data is sufficient to start with 79% accurate prediction. As more data comes in, the AI-based calibrating module 114 learns more and the accuracy of the prediction increases. AI-based calibrating module 114 assesses the minimum memory and CPU required for the critical, high, medium, and low criticality functionalities to be processed for that application and records those resource amounts.

In one or more illustrative embodiments of the AI-based calibrating module 114, the linear regression model is configured to compute and otherwise capture/collect:

1. When registered threads will be high memory consumers in a day and given point of time;
2. When registered threads will be on high CPU usage in a day and given point of time;
3. When is the appropriate time to run the low priority threads in a day and given point of time;
4. Probable threats to the high priority threads because of other threads in a day and given point of time;
5. Probable time lapse of all services and threads in a day and given point of time;
6. Probable amount of parallel processing of different threads (critical/high/medium/low) in a day and resource consumption;
7. In case of any errors, capture the details from the event logs (note that this will identify why an error happened, and the system can try to restrict that from happening); and
8. Overall system health in a day and given point of time.

As mentioned above, AI-based calibrating module 114 continues to collect and calibrate the prediction model even after the intelligent application guard is switched on for the application.

Turning now to intelligent application guard 116, intelligent application guard 116 inputs data from application function criticality manager 112 and AI-based calibrating module 114 and, in response thereto, decides what action(s) to take in order to protect the operations of critical and/or high priority functionalities. More particularly, intelligent application guard 116 is a module that uses the calibrated values and services for the application and threads/processes from the AI-based calibrating module 114 to safe guard all critical/high business processes. In one or more illustrative embodiments, intelligent application guard 116 determines which resources are removable such as, but not limited to, temporary files and unwanted disk space. In case of critical/high threads or processes, intelligent application guard 116 removes the removable resources first and then, if still not working, terminates low criticality threads or processes. Intelligent application guard 116 gives notice to the user (who can override the terminate decision), as well as to application function criticality manager 112 and AI-based calibrating module 114. In one or more embodiments, intelligent application guard 116 is configured to even terminate anti-virus programs or any other non-operating system services in order to enable/preserve execution of a critical functionality of the application. Note that the priority values (210 in FIG. 2) may also be considered as defining an order for terminating functionalities of the application. Note that intelligent application guard 116, in some embodiments, is turned on at the direction of the AI-based calibrating module 114 and/or the user. The condition of the intelligent application guard 116 being on or executing is referred to "guard mode" on. Guard mode off is the condition when intelligent application guard 116 is off or not executing.

Advantageously, as described herein, AI-based application safe guarding system 110 allows a user to register their application and choose different processes and functions and assign first the criticality and then the priority among them. The system 110 runs in production over a period of time and gathers the data and using, e.g., a linear regression method, predicts the probable resources required for the process. Once calibrated, the system 110 starts safe guarding all critical/high priority processes by one or more of de-allocating the memory, deleting temporary data files (cache), terminating low priority threads/processes, terminating long running business functions, suggesting appropriate times for low priority threads, making critical processes resource-ready for peak time rise, etc. Resource-ready means, by way of example, that sufficient resources (e.g., memory, CPU, disk, network, etc.) are allocated and ready for use at a given time of significant traffic or need (e.g., peak time) in order to ensure that a functionality of critical or high criticality is able to execute. In various illustrative embodiments, system 110 gives a user a choice with respect to which functionalities to terminate, automatically terminates specific functionalities, or some combination thereof. Such application safe guarding techniques, inter alia, save system downtime otherwise associated with critical application process failures (e.g., order download, routing, etc.).

Given the above illustrative descriptions of the AI-based application safe guarding system 110, some illustrative use cases are given.

Use Case 1: Critical process about to fail with chocking the resources
1. System will always try to keep those factors free for the critical process with the help of the prediction model, when the critical process will probably be running in a day.
2. If there is any unusual chock notified for any critical service (e.g., order download), the system will check other low priority threads are running, if not check the medium, then high.
3. If the system found a thread that is using unusually high amounts of resources, the system will terminate that thread and send a notification to the user to alert the user of the reason(s).

Use Case 2: Business Function or Service Taking Too Much Time to Complete
1. System checks whether the service is lacking computing resources.
2. If so, follow the process of Use Case 1.
3. Else, check the database wait time for query (execute a simple select query to database table, where that business function is querying data from).
4. If query tables take a long time, try to release the database block (most of the time the database percolates back to the middle tier and starts consuming computing resources, and will end up operating as in Use Case 1).
5. If the system cannot overcome the issue, the system sends a notification (e.g., email) to database administrator to handle the database wait and block.

FIG. 5A depicts a methodology 500 for AI-based application safe guarding, according to an illustrative embodiment. It is to be understood that methodology 500 can be performed by information processing system 100 in FIG. 1 in one or more illustrative embodiments.

As shown, step 502 obtains a plurality of criticality levels for a plurality of functionalities of a computer program configured to execute on a computer system, wherein the computer system comprises one or more resources usable to execute the computer program.

In step 504, data for the plurality of functionalities of the computer program is collected.

Further, step 506 predicts usage of the one or more resources for executing the plurality of functionalities of the computer program for a given set of data.

Step 508 then performs the safe guarding by ensuring execution of a portion of the plurality of functionalities of the computer program based on the predicted usage of the one or more resources and the criticality level for each of the plurality of functionalities of the computer program.

Figure 5B:
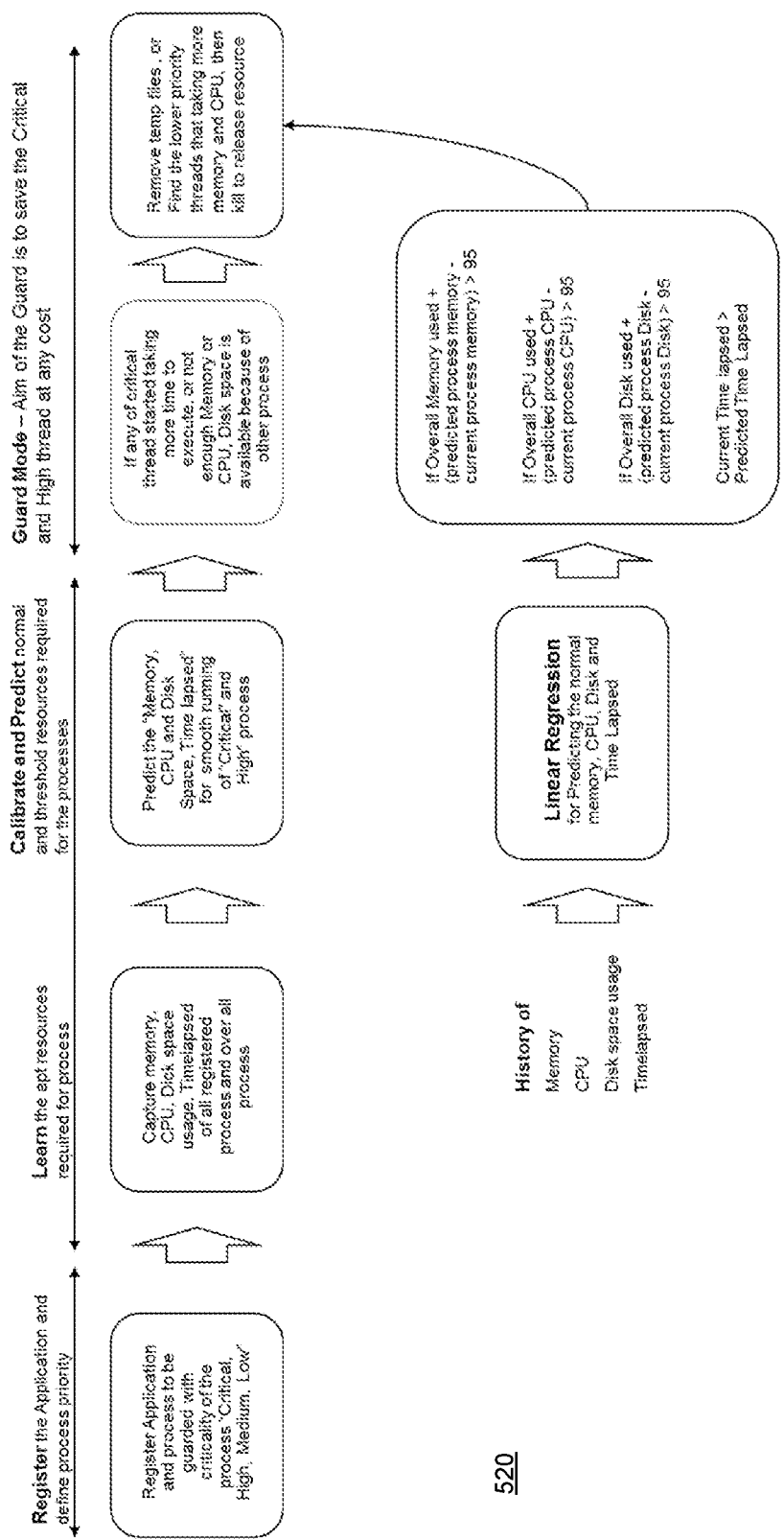

FIG. 5B depicts an illustrative flow 520 for an AI-based application safe guarding methodology, according to an illustrative embodiment. More particularly, flow 520 summarizes an example of the methodology 500 in FIG. 5A using linear regression as further described herein.

Advantageously, as further described herein, safe guarding execution of at least a portion of the functionalities may be achieved by one or more of de-allocating memory, deleting one or more temporary data files, terminating one or more functionalities with a low criticality level, rescheduling one or more functionalities with a low criticality level, terminating the low priority functionalities, and ensuring one or more functionalities with a critical or a high criticality level are resource-ready for a peak time (i.e., have the resources available to use when the critical/high functionality has to be executed). An analogy is made to cancer medicine where a goal is to preserve life, not preserve non-life-threatening side effects. A main goal of the application safe guarding system is to provide sufficient resources (predicted) to the critical functionalities, even if this means terminating low criticality/priority functionalities and de-allocating the resources used for the low criticality/priority functionalities in favor of using them for the critical functionalities.

For example, the application safe guarding system ensures execution of a portion of the plurality of functionalities of the computer program based on the predicted usage of the one or more resources and the criticality level for each of the plurality of functionalities of the computer program. In one example, this includes first de-allocating memory by deleting temporary files, then stopping the low-level functionalities, then stopping medium level functionalities, and then stopping the programs such as antivirus software. Thus, in another example, the application safe guarding system saves the critical functionalities at the cost of stopping low, medium and high-level functionalities and causes re-allocation of memory and CPU capacities to enable completion of the critical-functionality execution processes.

Figure 6:
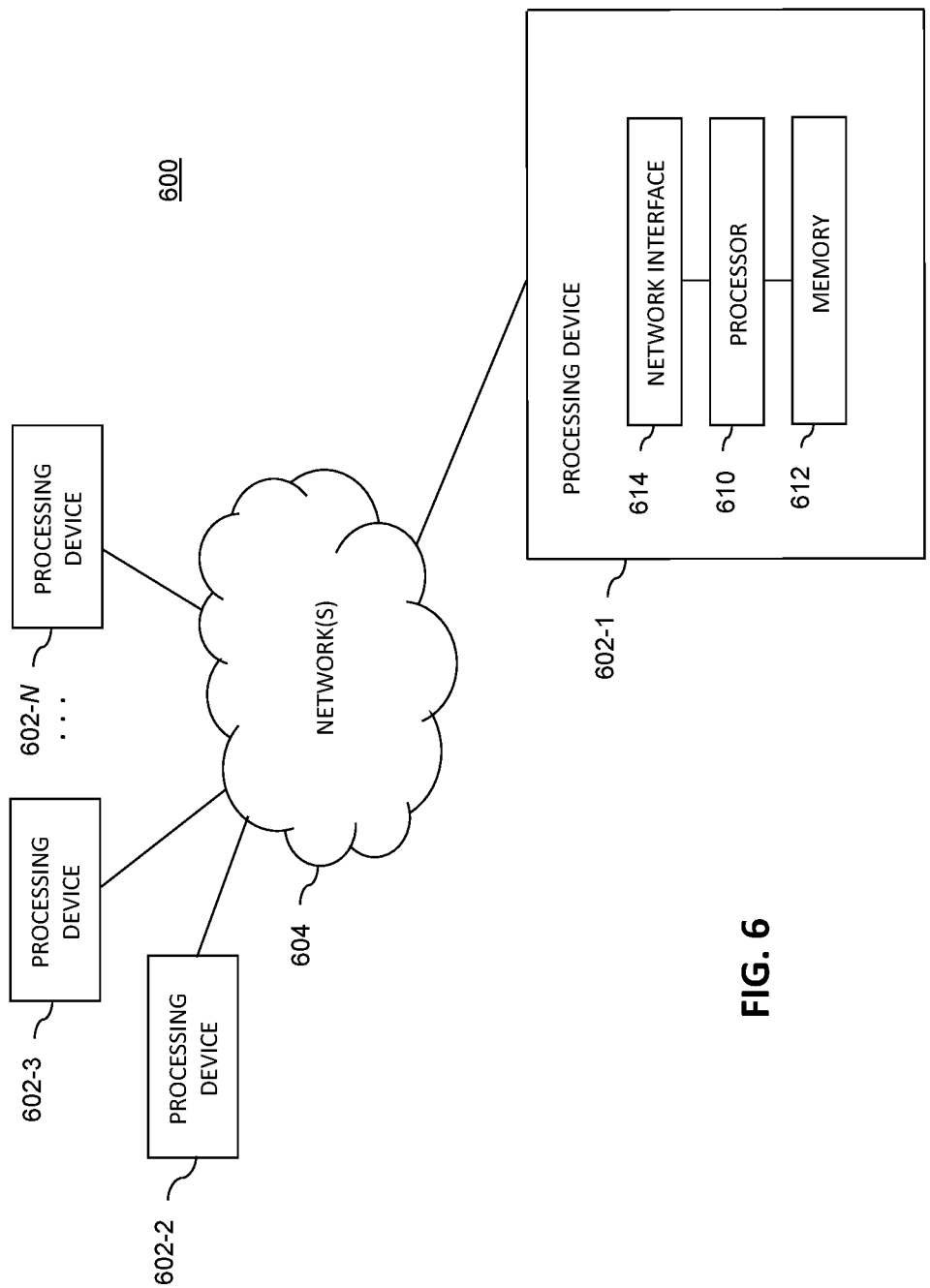
FIG. 6 depicts a processing platform used to implement an information processing system environment with an AI-based application safe guarding system, according to an illustrative embodiment.

FIG. 6 depicts a processing platform 600 used to implement AI-based application safe guarding, according to an illustrative embodiment. More particularly, processing platform 600 is a processing platform on which a computing environment with functionalities described herein (e.g., FIGS. 1-5B and otherwise described herein) can be implemented.

The processing platform 600 in this embodiment comprises a plurality of processing devices, denoted 602-1, 602-2, 602-3, . . . 602-N, which communicate with one another over network(s) 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 602 shown in FIG. 6. The network(s) 604 represent one or more communications networks that enable components to communicate and to transfer data therebetween, as well as to perform other functionalities described herein.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random-access memory (RAM), read-only memory (ROM) or other types of memory, in any combination. The one or more software programs when executed by a processing device such as the processing device 602-1 causes the device to perform functions associated with one or more of the components/steps of system/methodologies in FIG. 1. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the networks 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for processing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1 through 6 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
   at least one processing device comprising a processor operatively coupled to a memory, wherein the at least one processing device is configured to:
   register a plurality of functionalities of a computer program configured to execute on a computer system, wherein the computer system comprises one or more resources usable to execute the computer program;
   assign criticality levels for at least some of the functionalities of the computer program;
   predict usage of the one or more resources for executing the plurality of functionalities of the computer program for a given set of data; and
   ensure execution of a portion of the plurality of functionalities of the computer program based on the predicted usage of the one or more resources and the criticality level for the at least some of the plurality of functionalities of the computer program.

2. The system of claim 1, wherein the at least one processing device is further configured to obtain a plurality of priority values for the plurality of functionalities.

3. The system of claim 1, wherein the computer program comprises an application.

4. The system of claim 3, wherein the plurality of functionalities comprises one or more of a business function, a process, a method, a thread, a service, a set of code, or parts thereof, associated with the application.

5. The system of claim 1, wherein the collected data comprises performance attributes over a given time period for execution of one or more of the plurality of functionalities of the computer program.

6. The system of claim 5, wherein the performance attributes for a given one of the plurality of functionalities comprise one or more of a memory usage, a processor usage, a disk usage, and one or more time attributes.

7. The system of claim 1, wherein the at least one processing device is further configured to predict usage of the one or more resources for executing the plurality of functionalities of the computer program for the given set of data using a linear regression algorithm.

8. The system of claim 1, wherein the plurality of criticality levels comprises low, medium, high and critical.

9. The system of claim 8, wherein the at least one processing device is further configured to ensure execution of a portion of the plurality of functionalities of the computer program by one or more of de-allocating memory, deleting one or more temporary data files, terminating one or more functionalities with a given criticality level, rescheduling one or more functionalities with a given criticality level, and ensuring one or more functionalities with a given criticality level are resource-ready for a given time.

10. The system of claim 1, wherein the at least one processing device is further configured to perform the registering, the assigning, the predicting, and the ensuring for a plurality of functionalities of another computer program.

11. The system of claim 10, wherein the at least one processing device is further configured to perform the ensuring differently for the one computer program compared to the other computer program.

12. The system of claim 1 wherein the at least one processing device is configured to utilize a function criticality manager to perform the steps of registering and assigning, the function criticality manager receiving input by at least one user.

13. A method, comprising:
   registering a plurality of functionalities of a computer program configured to execute on a computer system, wherein the computer system comprises one or more resources usable to execute the computer program;
   assigning criticality levels for at least some of the functionalities of the computer program;
   predicting usage of the one or more resources for executing the plurality of functionalities of the computer program for a given set of data; and
   ensuring execution of a portion of the plurality of functionalities of the computer program based on the predicted usage of the one or more resources and the criticality level for the at least some of the plurality of functionalities of the computer program;
   wherein the steps are performed by at least one processing device comprising a processor operatively coupled to a memory.

14. The method of claim 13, further comprising obtaining a plurality of priority values for the plurality of functionalities.

15. The method of claim 13, wherein the computer program comprises an application and the plurality of functionalities comprises one or more of a business function, a process, a method, a thread, a service, a set of code, or parts thereof, associated with the application.

16. The method of claim 13, wherein the collected data comprises performance attributes over a given time period for execution of one or more of the plurality of functionalities of the computer program, and wherein the performance attributes for a given one of the plurality of functionalities comprise one or more of a memory usage, a processor usage, a disk usage, and one or more time attributes.

17. The method of claim 13, wherein predicting usage of the one or more resources for executing the plurality of functionalities of the computer program for the given set of data uses a linear regression algorithm.

18. The method of claim 13, wherein ensuring execution of a portion of the plurality of functionalities of the computer program further comprises one or more of de-allocating memory, deleting one or more temporary data files, terminating one or more functionalities with a given criticality level, rescheduling one or more functionalities with a given criticality level, and ensuring one or more functionalities with a given criticality level are resource-ready for a given time.

19. An article of manufacture comprising a non-transitory processor-readable storage medium having stored therein program code of one or more software programs, wherein the program code when executed by at least one processing device causes said at least one processing device to perform steps of:
- registering a plurality of functionalities of a computer program configured to execute on a computer system, wherein the computer system comprises one or more resources usable to execute the computer program;
- assigning criticality levels for at least some of the functionalities of the computer program;
- predicting usage of the one or more resources for executing the plurality of functionalities of the computer program for a given set of data; and
- ensuring execution of a portion of the plurality of functionalities of the computer program based on the predicted usage of the one or more resources and the criticality level for the at least some of the plurality of functionalities of the computer program.

20. The article of manufacture of claim 19, wherein the at least one processing device is further configured to obtain a plurality of priority values for the plurality of functionalities.

* * * * *